United States Patent
Siniarski et al.

(10) Patent No.: US 6,582,293 B1
(45) Date of Patent: Jun. 24, 2003

(54) AIR VENT DAMPER APPARATUS

(76) Inventors: Andrew Siniarski, 208-18 Welsford Gardens, North York, Ontario (CA), M3A 2P5; Karel Caslavsky, 161 First Avenue, Toronto, Ontario (CA), M4M 1X2

( * ) Notice: Subject to any disclaimer, the term of this patent is extended or adjusted under 35 U.S.C. 154(b) by 0 days.

(21) Appl. No.: 09/702,531

(22) Filed: Oct. 31, 2000

Related U.S. Application Data

(60) Provisional application No. 60/162,973, filed on Nov. 1, 1999.

(51) Int. Cl.⁷ .................................................. B60H 1/34
(52) U.S. Cl. ........................ 454/155; 454/322; 454/333
(58) Field of Search .......................... 454/69, 152, 155, 454/322, 333

(56) References Cited

U.S. PATENT DOCUMENTS

| | | | | |
|---|---|---|---|---|
| 19,678 A | * | 3/1858 | Barrows, Jr. ................. 454/322 |
| 3,861,281 A | * | 1/1975 | Godwin ....................... 454/155 |
| 3,921,507 A | | 11/1975 | Condet et al. |
| 4,610,196 A | * | 9/1986 | Kern .......................... 454/127 |
| 4,796,518 A | | 1/1989 | Murray |
| 4,840,114 A | * | 6/1989 | Bauer et al. ................. 454/322 |
| 4,887,520 A | * | 12/1989 | Bauer ......................... 454/155 |
| 5,120,272 A | | 6/1992 | Soethout et al. |
| 5,176,567 A | * | 1/1993 | Piritore et al. ............... 454/155 |
| 5,340,357 A | | 8/1994 | Nagai et al. |
| 5,397,267 A | | 3/1995 | Vecellio et al. |
| 5,470,276 A | | 11/1995 | Burnell et al. |
| 5,482,506 A | | 1/1996 | Tsuda et al. |
| 5,690,550 A | | 11/1997 | Mikowski |
| 5,741,179 A | | 4/1998 | Sun et al. |
| 5,757,877 A | | 5/1998 | Wiltin |

FOREIGN PATENT DOCUMENTS

DE 4327266 C1 * 8/1994
DE 19529451 C1 * 11/1996

* cited by examiner

*Primary Examiner*—Jiping Lu
(74) *Attorney, Agent, or Firm*—Reising, Ethington, Barnes, Kisselle, Learman & McCulloch, P.C.

(57) ABSTRACT

An air vent damper assembly that controls air flow into the passenger compartment of an automotive vehicle and includes an air passage having a generally rectangular cross-section and a gasketless damper door. The damper door pivots between a closed position in which the door blocks airflow and a fully open position in which the door presents minimum obstruction to airflow. The damper door may be set at intermediate positions between closed and fully open to meter airflow and to direct air flowing from the exit end of the air passage.

18 Claims, 6 Drawing Sheets

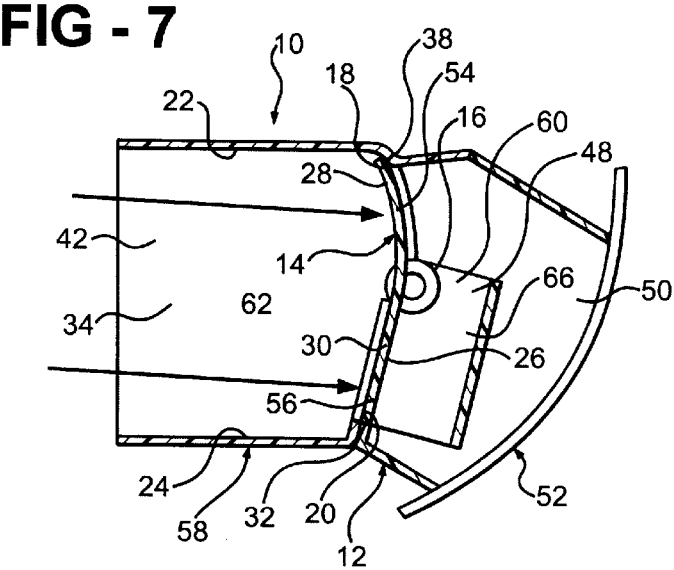
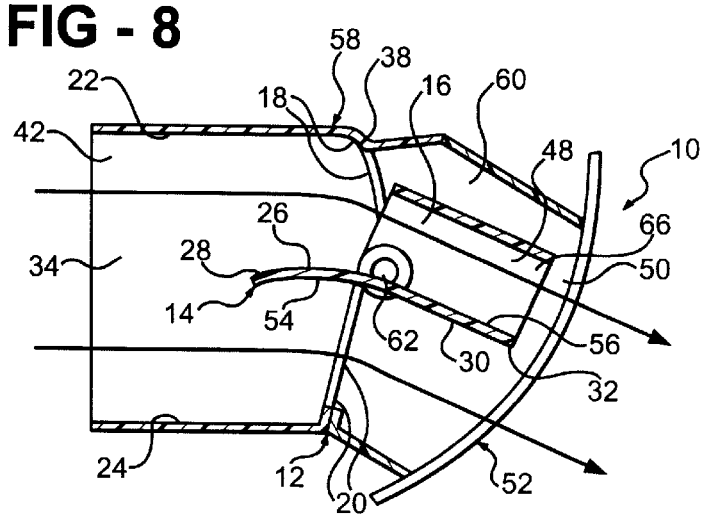
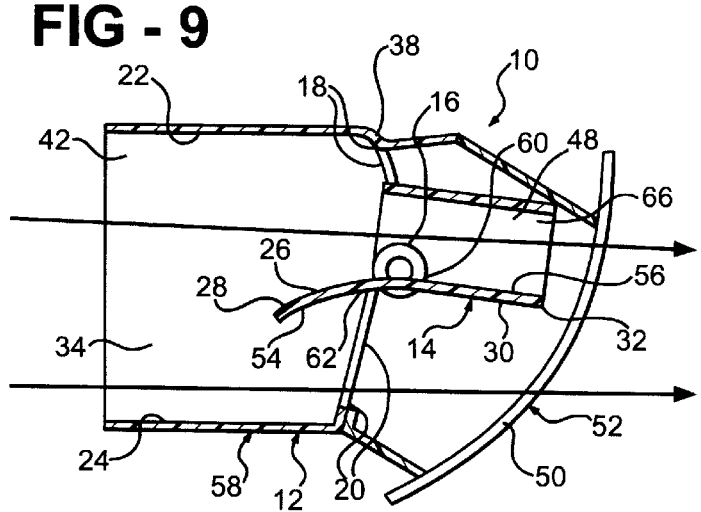

AIR VENT DAMPER APPARATUS

This application claims priority of U.S. provisional patent application No. 60/162,973 filed Nov. 1, 1999.

TECHNICAL FIELD

This invention relates generally to an air vent damper apparatus for controlling airflow into the passenger compartment of an automotive vehicle.

BACKGROUND OF THE INVENTION

Automotive vehicle air conditioning and ventilation systems include air vent control assemblies that vehicle occupants can use to control the amount of air flowing into a vehicle passenger compartment as well as the direction of airflow. Some air vent control assemblies include damper doors that are pivotally supported near the exit or exhaust end of air passages and that provide fluid communication between air sources and passenger compartments. Such assemblies may also include one or more air louvers that are pivotable to direct airflow from air passages into passenger compartments. It is desirable for such a control assembly to include a structure or structures that seal off or severely limit the amount of air that is allowed to leak around a perimeter of the damper door when the door is in a closed position. It is also desirable that the damper door in such a system be configured to impart as little turbulence as possible to airflow through the air passage when the doors are out of their closed positions.

One example of such an air vent control assembly is found in the Audi A6. The Audi control assembly includes a gasket-ringed damper door pivotally supported within an air passage of generally rectangular cross-section. The damper door rotates between a closed position in which the door blocks airflow through the air passage and a fully open position in which the door presents minimum obstruction to airflow through the air passage. In the closed position the edges of the damper door engage door stop surfaces in the form of ribs protruding inward from sidewalls of the air passage. The ribs and the door cooperate to more effectively shut-off the flow of air. The damper door may also be set at intermediate positions between closed and fully open to meter the amount of airflow through the air passage.

One of the door stop surfaces in the Audi system is positioned and shaped to engage an inner surface of the damper door along one side edge of the damper door when the damper door is in the closed position. The other stop surface is positioned and shaped to engage an outer surface of the damper door along a side edge of the damper door opposite the one side edge when the damper door is in the closed position. The door stop surfaces are shaped to complement and lie flat against the respective damper door surfaces that they engage. This reduces airflow between the interior surface of the air passage and the lateral edges of the door when the door is in the closed position.

One of the door stop surfaces of the Audi vent control assembly is defined by an offset formed in the air passage. It is desirable to mold stop surfaces by forming an offset in the air passage because it is considerably more difficult to mold ribs that extend inward from interior surfaces of a closed tube.

The Audi vent control assembly also includes a plurality of air louvers pivotally supported in the air passage adjacent an exit end of the air passage. The air louvers are operatively interconnected to pivot together and remain parallel to one another to direct air flowing from the exit end of the air passage. Without the air louvers, air vent damper assemblies of the type installed in the Audi A6 would only be able to control volume of airflow and would be unable to change the direction of air exiting the air passage.

Other vent control assemblies are also known to employ damper door edge gaskets to seal damper doors against inner air passage walls. Edge gaskets of this type are typically made of rubber, foam or other suitably soft elastomeric polymeric materials and are supported around the outer edge of a damper door. Problematically, when a damper door with an edge gasket is out of its closed position, the presence of the edge gasket tends to increase turbulence in the passing air and causes a pressure drop across the portion of the air passage that contains the damper door.

INVENTION SUMMARY

An air vent damper assembly for controlling air flow into the passenger compartment of an automotive vehicle. The assembly includes a gasketless damper door pivotally supported in an air passage for rotation about a door axis between a closed position in which the door blocks airflow through the air passage and a fully open position in which the door presents minimum obstruction to airflow through the air passage. The damper door is positionable at intermediate positions between closed and fully open to meter the amount of airflow through the air passage.

Unlike the prior art, the damper door is configured and positioned to direct air flowing from the exit end of the air passage when the damper door is out of the closed position. Configuring a single gasketless door to alternately shut off and direct air flowing from the air passage precludes the need for louvers to be added downstream from the door for the purpose of directing air.

According to another aspect of the invention, two elongated door stop surfaces extend perpendicularly inward from respective opposing side walls of an interior surface of the air passage. One of the door stop surfaces is positioned and shaped to engage an inner surface of the damper door along one side edge of the damper door when the damper door is in the closed position. The other of the two door stop surfaces is positioned and shaped to engage an outer surface of the damper door along a side edge of the damper door opposite the one side edge when the damper door is in the closed position. The door stop surfaces are shaped to complement and lie flat against the respective damper door surfaces that they engage to reduce airflow between the interior surface of the air passage and the lateral edges of the door when the door is in the closed position. The complementary shapes of the interfacing door surfaces and stop surface precludes the need to include a sealing gasket.

According to another aspect of the invention the air vent damper assembly is adapted to provide an angled air passage in which the exit end of the air passage is angled relative to the rest of the air passage and includes an elbow at the point of directional change. The damper door axis is disposed at the elbow and the leading panel of the damper door is oriented relative to the trailing panel at an angle approximating that of the angle measured between the exit end of the air passage and the rest of the air passage.

According to another aspect of the invention a louver is supported on the damper door and is configured to pivot with the damper door. The louver cooperates with the damper door and amplifies the effectiveness of the damper door in directing air flowing from the exit end of the air passage when the damper door is out of the closed position.

According to another aspect of the invention the louver is connected to a trailing panel of the damper door by upper and lower horizontal ribs. The louver, ribs and trailing panel define an upright, rigid rectangular box-shaped air channel.

According to another aspect of the invention the assembly includes an occupant-operable mechanical interface configured to allow a vehicle occupant to pivot the damper door between the closed and fully open positions. The interface allows damper door position control without direct damper door manipulation.

According to another aspect of the invention the mechanical interface includes a bushing positioned and configured to provide sufficient friction to prevent uncommanded movement of the damper. The bushing preferably comprises an acetal resin because of its characteristic resistance to creep.

According to another aspect of the invention the lever is supported on the air passage for pivotal motion about a thumbwheel axis and the lever includes a cylindrical axial extension having an outer cylindrical surface concentrically disposed around the thumbwheel axis. The bushing is a ring-type bushing slidably supported around the outer cylindrical surface of the cylindrical axial extension and is fixed against rotation relative to the air passage. The bushing is configured to permit pivotal movement of the lever within the bushing while dampening lever motion by maintaining radially inward pressure on the outer cylindrical surface of the lever. The bushing may be a spring bushing configured to maintain a generally constant amount of constricting radially inward force on the outer cylindrical surface of the cylindrical axial extension. The spring bushing includes a lobe formed radially outwardly at one point along the circumference of a ring portion of the bushing. The lobe is configured to allow the ring portion of the bushing to expand radially without plastically deforming and to enable the ring portion to maintain a generally constant radially inwardly directed force on the outer cylindrical surface of the cylindrical axial extension.

According to another aspect of the invention the mechanical interface includes an over-center lock. The over-center lock holds the damper door firmly in the closed position while allowing an operator to overcome the lock to open the door.

BRIEF DESCRIPTION OF THE DRAWINGS

These and other features and advantages of the invention will become apparent to those skilled in the art in connection with the following detailed description and drawings in which:

FIG. 7 is a schematic cross-sectional top view of the air vent damper apparatus of FIG. 1 with the damper door shown in the closed position;

FIG. 8 is a schematic cross-sectional top view of the air vent damper apparatus of FIG. 1 with the damper door shown in an intermediate position; and FIG. 9 is a schematic cross-sectional top view of the air vent damper apparatus of FIG. 1 with the damper door shown in a fully-open position.

DETAILED DESCRIPTION

Figure 5:
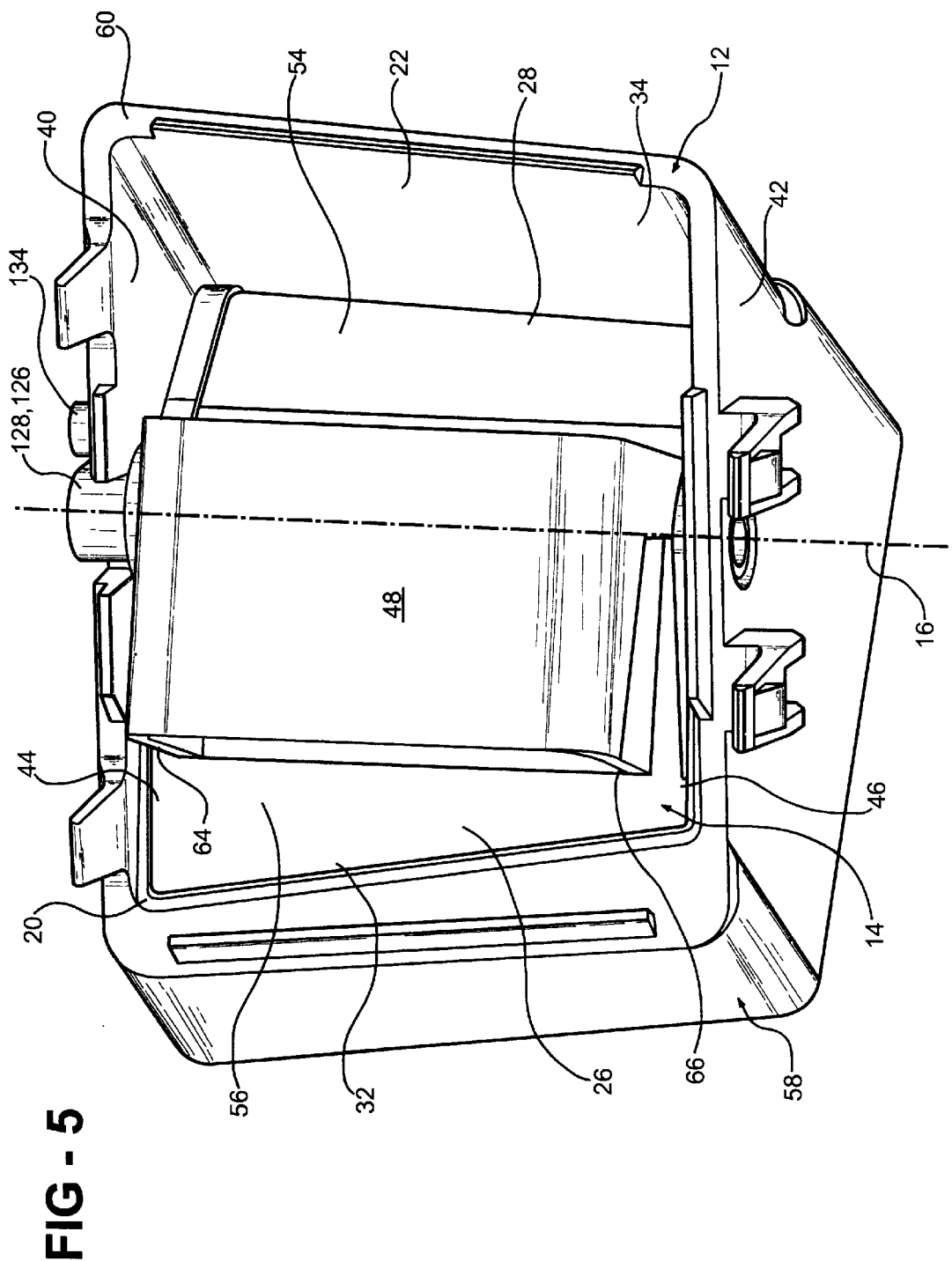
FIG. 5 is a back perspective view of the rear housing and damper door of the air vent damper apparatus of FIG. 1 with the damper door shown in the closed position.

An air vent damper apparatus for controlling airflow into the passenger compartment of an automotive vehicle is shown at 10 in FIGS. 1, 2 and 7–9. The apparatus 10 includes an air passage 12 having a generally rectangular cross-section and a gasketless damper door 14 pivotally supported in the air passage 12 for rotation about a door axis 16. The damper door 14 is rotatable between a closed position shown in FIGS. 5 and 7 and a range of open positions shown in FIGS. 1, 8 and 9. In the closed position the door 14 blocks airflow through the air passage 12. Throughout most of the range of open positions the door 14 causes very little variation in airflow—except in the immediate vicinity of the closed position. The damper door 14 is also rotatable to a range of intermediate positions and may be set in any of those intermediate positions between the closed and fully open positions to change the direction of air exiting the air passage 12.

As is best shown in FIGS. 7–9, the air vent damper apparatus 10 also includes two elongated door stop surfaces 18, 20, each approximately 2–3 mm in width, that extend perpendicularly inward from opposing sidewalls 22, 24 of the air passage 12. A first door stop surface 18 of the door stop surfaces 18, 20 is positioned and shaped to engage an outer surface 26 of the damper door 14 along one side edge 28 of the damper door 14 when the damper door 14 is in the closed position shown in FIG. 7. A second door stop surface 20 of the two door stop surfaces 18, 20 is positioned and shaped to engage an inner surface 30 of the damper door 14 along a side edge 32 of the damper door 14 opposite the one side edge 28 when the damper door 14 is in the closed position. The door stop surfaces 18, 20 are shaped to complement and lie flat against the respective damper door surfaces 26, 30 that they engage. This reduces airflow between an interior surface 34 of the air passage 12 and the side edges 28, 32 of the door 14 when the door 14 is in the closed position. One of the door stop surfaces 18, 20 is defined by an offset 38 formed in the air passage 12. The stop surfaces 18, 20 cooperate with the damper door 14 to reduce air leakage around the edges 28, 32 of the damper door 14 in the closed position. The door stop surfaces 18, 20 also extend inward along upper and lower walls 40, 42 of the air passage 12 from the respective sidewalls 22, 24. This reduces airflow between the upper and lower walls 40, 42 of the air passage 12 and upper and lower edges 44, 46 of the door 14, respectively, when the door 14 is in the closed position.

Figure 1:
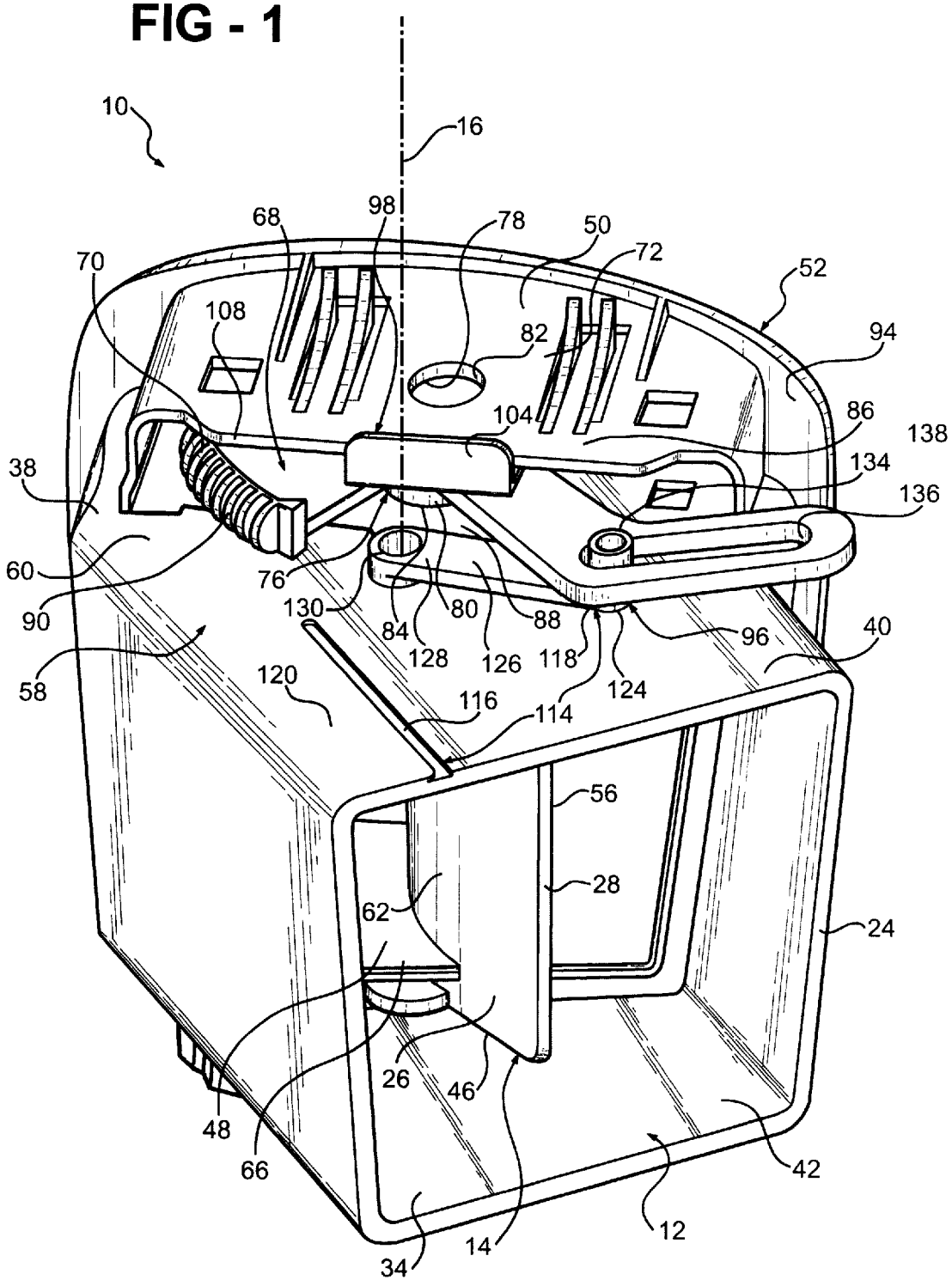
FIG. 1 is a back perspective view of an air vent damper apparatus constructed according to the invention and with the damper door in the fully open position.

As shown in FIGS. 1, 2 and 5–9, a planar air louver 48 is pivotally supported in the air passage 12 adjacent an exit end 50 of the air passage 12. The louver 48 is shaped and positioned to direct air flowing from the exit end 50 of the air passage 12 toward target points in the vehicle passenger compartment. A vent outlet assembly 52 defines the exit end 50 of the air passage 12. The louver 48 is supported on the damper door 14 and is configured to pivot with the damper door 14 and to cooperate with the damper door 14 in directing air flowing from the exit end 50 of the air passage 12 through the outlet assembly 52 when the damper door 14 is out of the closed position as shown in FIGS. 1, 8 and 9.

The damper door 14 includes a planar leading panel 54 disposed forward of the door axis 16 and a planar trailing panel 56 disposed aft of the door axis 16. The leading panel 54 extends forward from the door axis 16 in a direction generally opposite the direction of airflow in the air passage 12. The trailing panel 56 extends aft from the door axis 16 in the general direction of airflow in the air passage 12.

As is best shown in FIGS. 7–9, the exit end 50 of the air passage 12, which is defined by the vent outlet assembly 52, is angled relative to a damper door housing portion 58 or "rear housing" of the air passage 12. This angled relationship forms an elbow region 60 in the air passage 12. The damper door axis 16 extends vertically through the damper door housing portion 58 of the air passage 12 (the rear housing) in the elbow region 60 of the air passage 12. The leading panel 54 of the door 14 is oriented relative to the trailing panel 56 at an angle approximating that of the angle measured between the exit end 50 of the air passage 12 and the door housing portion 58 of the air passage 12. The angle between the leading panel 54 and the trailing panel 56 of the damper door 14 helps direct the flow of air around the elbow region 60 when the damper door 14 is out of the closed position.

To help minimize the pressure drop due to turbulence that results when air is forced to "turn the corner" at the junction of the two panels 54, 56, the damper door 14 includes a curved portion 62 between the leading panel 54 and trailing panel 56. The curved portion 62 blends the panels 54, 56 together at their junction allowing passing air molecules to change direction gradually.

Figure 2:
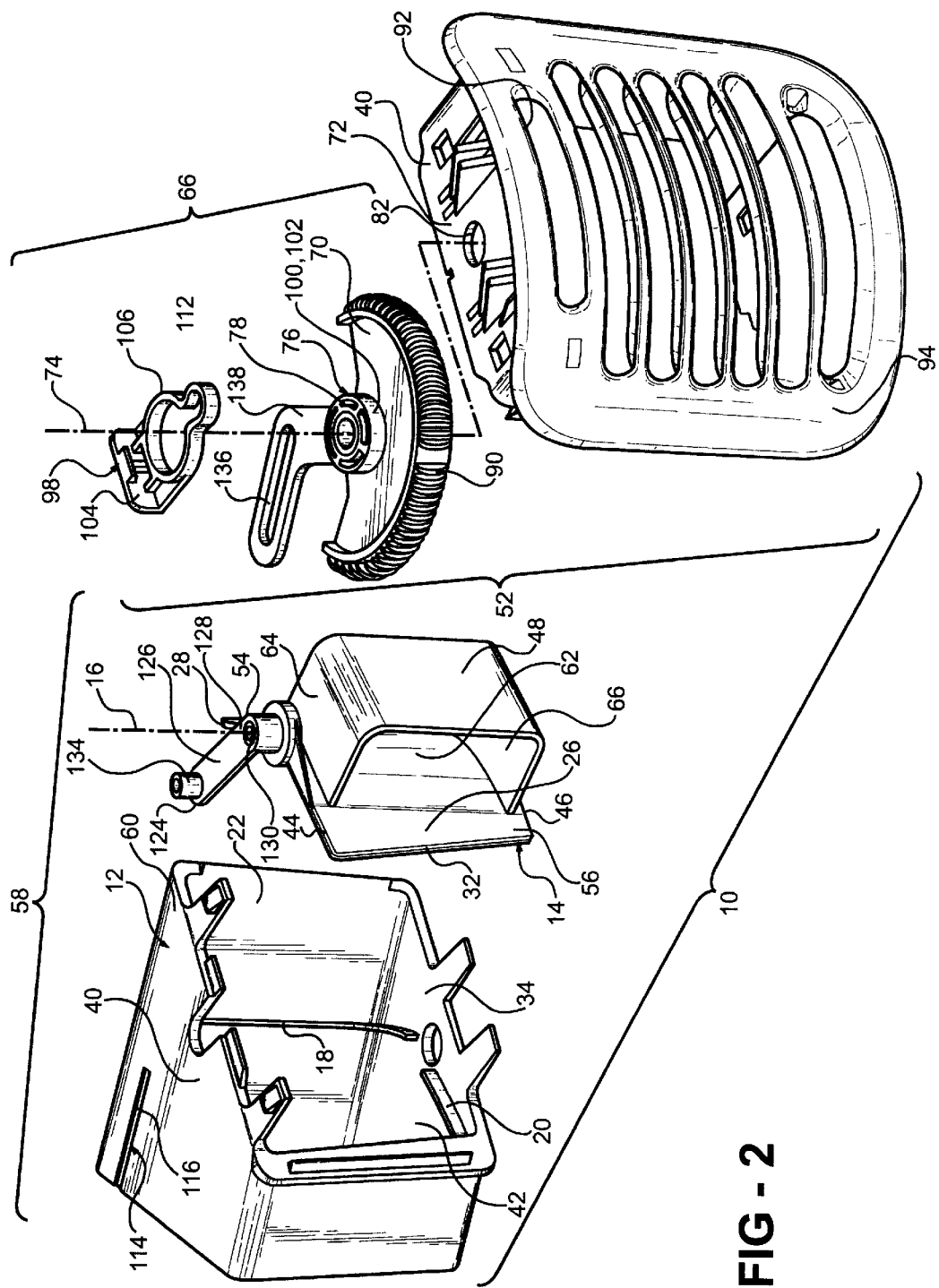
FIG. 2 is an exploded front perspective view of the air vent damper apparatus of FIG. 1.
Figure 6:
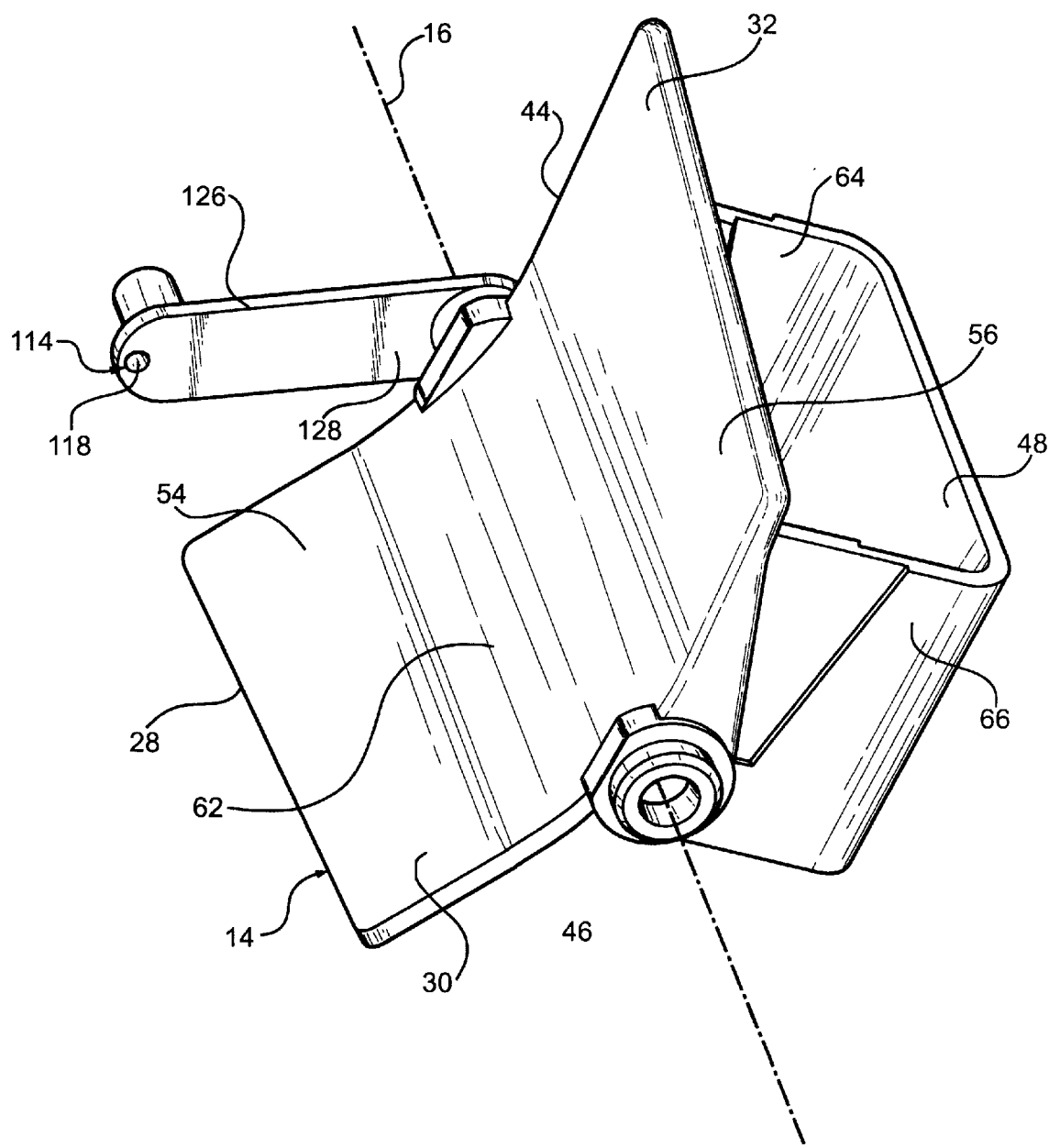
FIG. 6 is a perspective view of the damper door of the air vent damper apparatus of FIG. 1.

The louver 48 is supported on and is disposed parallel to the trailing panel 56 of the damper door 14 adjacent the exit end 50 of the air passage 12. As best shown in FIGS. 2 and 6, the louver 48 is connected to the trailing panel 56 of the damper door 14 by upper and lower horizontal ribs 64, 66. The louver 48, ribs 64, 66 and trailing panel 56 define an upright rectangular box-shaped air channel.

The air vent damper apparatus 10 also includes an occupant operable mechanical interface shown at 68 in FIGS. 1 and 2. The mechanical interface 68 is configured to allow a vehicle occupant to pivot the damper door 14 between the closed and fully open positions without directly manipulating the damper door 14.

The mechanical interface 68 includes a damper lever in the form of a thumbwheel 70 supported adjacent the exit end 50 of the air passage 12. The thumbwheel 70 is supported in a thumbwheel housing 72 of the vent outlet assembly 52 for pivotal motion about a thumbwheel pivot axis 74. The thumbwheel 70 includes a pivot mount 76 comprising upper and lower axially-extending cylindrical posts 78, 80 that extend through circular apertures 82, 84 in respective upper and lower walls 86, 88 of the thumbwheel housing 72. A ribbed circumferential section 90 of the thumbwheel 70 is exposed through an elongated generally horizontal window 92 in a front grill panel 94 of the vent outlet assembly 52 in a position to be easily manipulated by a vehicle occupant. The thumbwheel 70 is operably connected to the damper door 14 by a mechanical linkage 96 configured to pivot the damper door 14 in response to movement of the thumbwheel 70.

The mechanical interface 68 also includes a ring-type spring bushing, shown at 98 in FIGS. 1–4, that is positioned and configured to provide sufficient friction to prevent uncommanded movement of the damper door 14. In other words, the spring bushing 98 keeps the damper door 14 from pivoting out of positions that an operator places it in.

As shown in FIG. 2, the thumbwheel 70 includes a cylindrical axial extension 100 having an outer cylindrical surface 102 that is concentrically disposed around the thumbwheel pivot axis 74 and around the upper cylindrical post 78 of the pivot mount 76. The bushing 98 is slidably supported on the outer cylindrical surface 102 of the cylindrical axial extension 100. The bushing 98 is fixed against rotation relative to the air passage 12 by a lip 104 that extends radially outward from a ring portion 106 of the bushing 98 and engages an inner edge 108 of the upper wall 86 of the thumbwheel housing 72 of the vent outlet assembly 52. The lip 104 causes the bushing 98 to remain stationary while permitting pivotal movement of the thumbwheel 70 within the ring portion 106 of the bushing 98. The bushing 98 dampens thumbwheel 70 motion by maintaining radially inward pressure on the outer cylindrical surface 102. The spring bushing 98 is configured to keep the friction level between the bushing 98 and the outer cylindrical surface 102 of the cylindrical axial extension 100 low enough to provide ease of movement while meeting customer operating effort requirements and durability testing requirements.

The use of the ring bushing 98 makes the design and manufacturing of the thumbwheel housing 72 and the thumbwheel 70 easier because it is no longer necessary to form the pivot posts 78, 80 of the thumbwheel 70 pivot mount 76 and the circular apertures 82, 84 in the thumbwheel housing 72 that receive the pivot posts 78, 80 to such close tolerances. The bushing 98 preferably comprises a material, such as an acetal resin, that resists creep. (Acetal resins are available from DuPont under the trade name Delrin®.) The bushing 98 also comprises a material different from that used to form the thumbwheel 70. This helps to prevent squeaks that would characteristically be generated by frictional contact or rubbing between surfaces of components comprising like materials.

The bushing 98 provides radial springing action that maintains a generally constant amount of constricting radially inward force on the outer cylindrical surface 102 of the cylindrical axial extension 100 of the thumbwheel 70. Therefore, the amount of friction applied by the bushing 98 remains relatively constant over time—even after an inner circumferential contact surface 110 of the ring portion 106 of the bushing 98 begins to wear.

An inside diameter of the ring portion 106 of the bushing 98 is smaller than an outside diameter of the outer cylindrical surface 102 of the cylindrical axial extension 100 of the thumbwheel 70 by an amount sufficient to bring to bear a predetermined radially inwardly directed force on the outer cylindrical surface 102. This force is brought to bear once the ring portion 106 of the bushing 98 is elastically expanded and installed around the cylindrical axial extension 100 of the thumbwheel 70.

Figure 3:
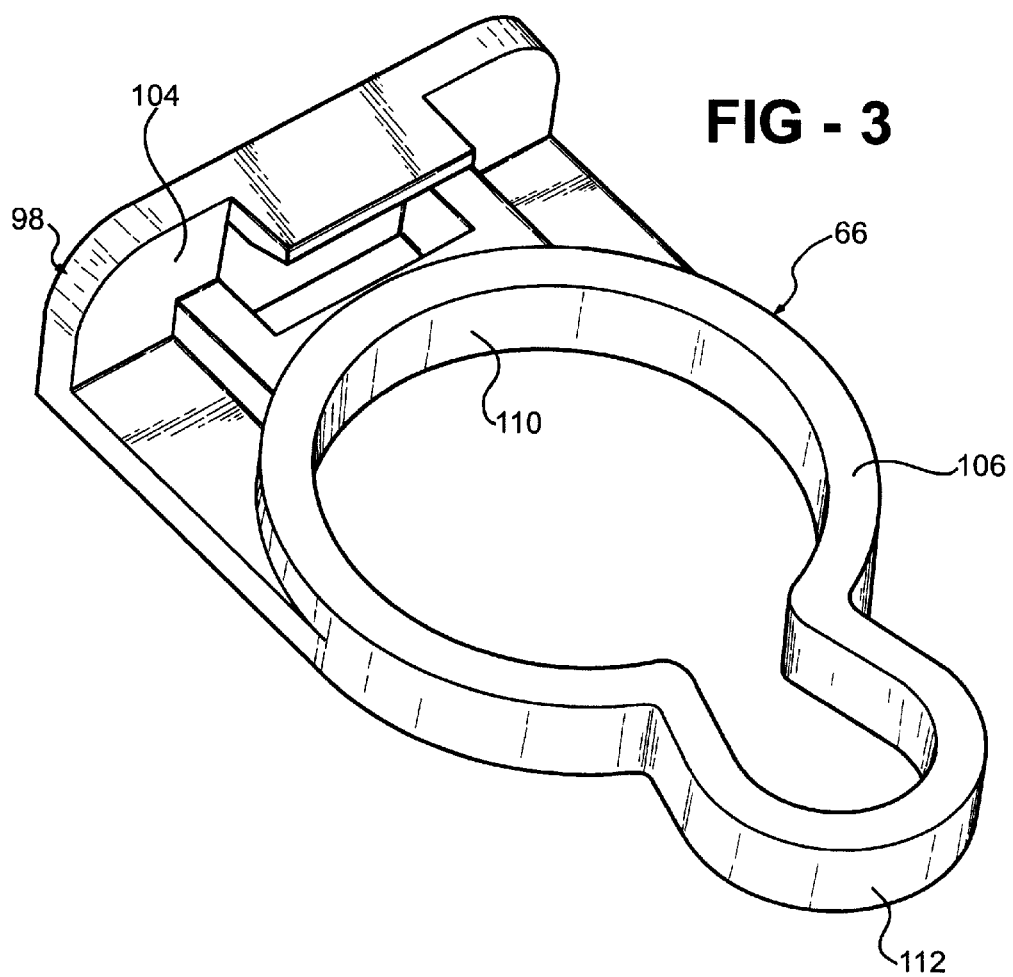
FIG. 3 is a perspective view of a spring bushing of the air vent damper apparatus of FIG. 1.
Figure 4:
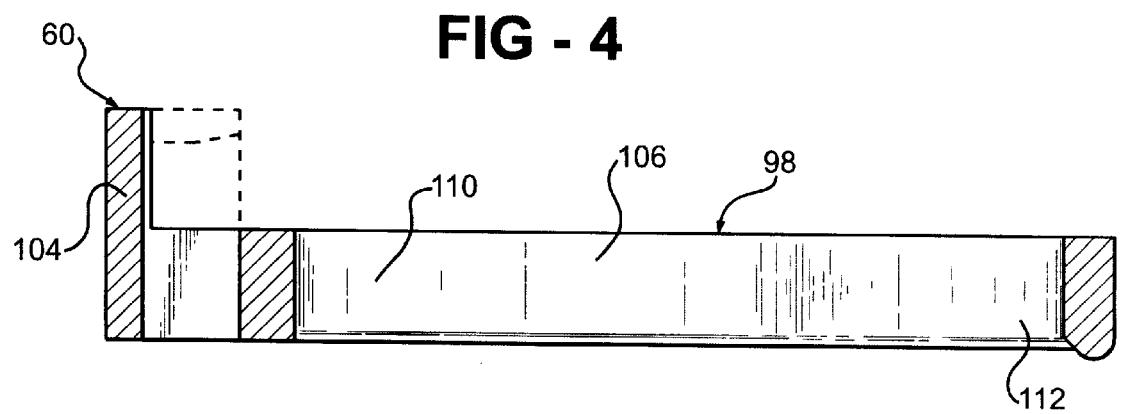
FIG. 4 is a cross-sectional side view of the spring bushing of FIG. 7.

At one point along its circumference the ring portion 106 of the bushing 98 is formed radially outward to form a lobe 112 as is best shown in FIGS. 2 and 3. The lobe 112 allows the ring portion 106 of the bushing 98 to be expanded without plastically deforming the ring portion 106. The lobe 112 also allows the ring portion 106 to maintain a constant radially inwardly directed force on the outer cylindrical surface 102 of the cylindrical axial extension 100 of the thumbwheel 70. The presence of the lobe 112 also eases installation of the bushing 98 by allowing an installer to expand the lobe 112 of the bushing 98 before installing the bushing 98 over the thumbwheel 70 axial extension 100.

As best shown in FIG. 1, the mechanical interface 68 also includes an over-center lock 114 configured to hold the damper door 14 firmly in the closed position. The over-center lock 114 includes a rib detent 116 and a nub 118 that engages the rib detent 116 to reversibly lock the damper door 14 in the closed position. The rib detent 116 extends integrally upward from an upper surface 120 of the upper wall 40 of the damper door housing portion 58 of the air passage 12. The nub 118 extends integrally downward from an outer end 124 of a crank member 126 of the linkage. The crank member 126 has an inner end 128 fixed to an upper pivot post 130 of the damper door 14 where the upper pivot post 130 extends upward through an upper pivot post aperture 132 in the upper wall 122 of the door housing portion 58 of the air passage 12. The crank member 126 also includes a cam post 134 that extends upward from the outer end 124 of the crank member 126. The cam post 134 is slidably received in a cam slot 136 in a cam arm 138 that extends from the thumbwheel 70 such that rotation of the thumbwheel 70 moves the cam post 134 through a semi-circular arc as the cam post 134 slides in the cam slot 136. Movement of the cam post 134 through the semi-circular arc pivots the damper door 14 between the closed and the fully open positions. The nub 118 and rib detent 116 are positioned such that a lower surface of the crank member 126 is in sliding contact with the rib detent 116 and the nub 118 must be forced to "hop" over the rib detent 116 for the damper door 14 to pivot into or out of the closed position.

This description is intended to illustrate certain embodiments of the invention rather than to limit the invention. Therefore descriptive rather than limiting words are used. Obviously, it's possible to modify this invention from what the description teaches and one may practice the invention other than as described.

What is claimed is:

1. An air vent damper assembly for controlling air flow into the passenger compartment of an automotive vehicle, the assembly comprising:
   an air passage;
   a gasketless damper door pivotally supported in the air passage for rotation about a door axis between a closed position in which the door blocks airflow through the air passage and a fully open position in which the door presents minimum obstruction to airflow through the air passage, the damper door being positionable at intermediate positions between closed and filly open to meter the amount of airflow through the air passage, the damper door being configured and positioned to control the direction of airflow from an exit end of the air passage when the damper door is out of the closed position;
   two elongated door stop surfaces extending perpendicularly inward from respective opposing side walls of an interior surface of the air passage, one of the door stop surfaces being positioned and shaped to engage an inner surface of the damper door along one side edge of the damper door when the damper door is in the closed position, the other of the two door stop surfaces being positioned and shaped to engage an outer surface of the damper door along a side edge of the damper door opposite the one side edge when the damper door is in the closed position; and
   the door stop surfaces being shaped to complement and lie flat against the respective damper door surfaces that they engage to reduce airflow between the interior surface of the air passage and the lateral edges of the door when the door is in the closed position.

2. An air vent damper assembly as defined in claim 1 in which one of the door stop surfaces is defined by an offset formed in the air passage.

3. An air vent damper assembly as defined in claim 1 in which the door stop surfaces extend inward along upper and lower walls of the air passage from the respective sidewalls.

4. An air vent damper assembly as defined in claim 1 in which the damper door includes a leading panel disposed forward of the door axis and a trailing panel disposed aft of the door axis.

5. An air vent damper assembly as defined in claim 4 in which the damper door includes a curved portion between the leading and trailing panels configured to blend the panels at their junction.

6. An air vent damper assembly as defined in claim 4 in which:
   the exit end of the air passage is angled relative to the rest of the air passage;
   the air passage includes an elbow at the point of directional change;
   the damper door axis is disposed at the elbow; and
   the leading panel is oriented relative to the trailing panel at an angle approximating that of the angle measured between the exit end of the air passage and the rest of the air passage.

7. An air vent damper assembly as defined in claim 6 in which an air louver is pivotally supported in the air passage adjacent an exit end of the air passage and is configured to direct air flowing from the exit end of the air passage toward a target point.

8. An air vent damper assembly for controlling air flow into the passenger compartment of an automotive vehicle, the assembly comprising:
   an air passage;
   a gasketless damper door pivotally supported in the air passage for rotation about a door axis between a closed position in which the door blocks airflow through the air passage and a fully open position in which the door presents minimum obstruction to airflow through the air passage, the damper door being positionable at intermediate positions between closed and fully open to meter the amount of airflow through the air passage, the damper door being configured and positioned to direct air flowing from the exit end of the air passage when the damper door is out of the closed position;
   two elongated door stop surfaces that extend perpendicularly inward from respective opposing side walls of an interior surface of the air passage, one of the door stop surfaces being positioned and shaped to engage an inner surface of the damper door along one side edge of the damper door when the damper door is in the closed position, the other of the two door stop surfaces being positioned and shaped to engage an outer surface of the damper door along a side edge of the damper door opposite the one side edge when the damper door is in the closed position, the door stop surfaces being shaped to complement and lie flat against the respective damper door surfaces that they engage to reduce airflow between the interior surface of the air passage and the lateral edges of the door when the door is in the closed position;
   the damper door including a leading panel disposed forward of the door axis and a trailing panel disposed aft of the door axis, the exit end of the air passage being angled relative to the rest of the air passage, the air passage including an elbow at the point of directional change, the damper door axis being disposed at the elbow, the leading panel being oriented relative to the trailing panel at an angle approximating that of the angle measured between the exit end of the air passage and the rest of the air passage;
   an air louver pivotally supported in the air passage adjacent an exit end of the air passage and configured to direct air flowing from the exit end of the air passage toward a target point, the louver being supported on the damper door and configured to pivot with the damper door and to cooperate with the damper door in directing air flowing from the exit end of the air passage when the damper door is out of the closed position.

9. An air vent damper assembly as defined in claim 8 in which the louver is supported on and is disposed parallel to the trailing panel of the damper door adjacent the exit end of the air passage.

10. An air vent damper assembly as defined in claim 9 in which the louver is connected to the trailing panel of the damper door by upper and lower horizontal ribs, the louver, ribs and trailing panel defining an upright box-shaped air channel.

11. An air vent damper assembly for controlling air flow into the passenger compartment of an automotive vehicle, the assembly comprising:

an air passage;

a gasketless damper door pivotally supported in the air passage for rotation about a door axis between a closed position in which the door blocks airflow through the air passage and a fully open position in which the door presents minimum obstruction to airflow through the air passage, the damper door being positionable at intermediate positions between closed and fully open to meter the amount of airflow through the air passage, the damper door being configured and positioned to control the direction of airflow from an exit end of the air passage when the damper door is out of the closed position;

an occupant-operable mechanical interface configured to allow a vehicle occupant to pivot the damper door between the closed and fully open positions without directly manipulating the damper door;

the mechanical interface including a lever supported adjacent the exit end of the air passage in a position to be easily manipulated by a vehicle occupant, a damper door operably connected to the lever by a mechanical linkage configured to pivot the damper door in response to movement of the lever, and a bushing positioned and configured to provide sufficient friction to prevent uncommanded movement of the damper door.

12. An air vent damper assembly as defined in claim 11 in which the bushing comprises an acetal resin.

13. An air vent damper assembly as defined in claim 11 in which the mechanical interface includes an over-center lock configured to hold the damper door firmly in the closed position.

14. An air vent damper assembly as defined in claim 13 in which:

the mechanical linkage includes a crank arm that rotates adjacent the air passage when the damper door is being pivoted;

the over-center lock includes a rib that extends integrally from one of an the air passage and the crank arm;

the over-center lock includes a nub that extends integrally from one of air passage and the crank arm; and the nub and rib are positioned such that the nub is forced to "hop" over the rib as the damper door is pivoted into and out of the closed position.

15. An air vent damper assembly for controlling air flow into the passenger compartment of an automotive vehicle, the assembly comprising:

an air passage;

a gasketless damper door pivotally supported in the air passage for rotation about a door axis between a closed position in which the door blocks airflow through the air passage and a fully open position in which the door presents minimum obstruction to airflow through the air passage, the damper door being positionable at intermediate positions between closed and fully open to meter the amount of airflow through the air passage;

the damper door being configured and positioned to direct air flowing from the exit end of the air passage when the damper door is out of the closed position;

an occupant-operable mechanical interface configured to allow a vehicle occupant to pivot the damper door between the closed and fully open positions without directly manipulating the damper door, the mechanical interface including a lever supported adjacent the exit end of the air passage in a position to be easily manipulated by a vehicle occupant, a damper door operably connected to the lever by a mechanical linkage configured to pivot the damper door in response to movement of the lever, and a bushing positioned and configured to provide sufficient friction to prevent uncommanded movement of the damper;

the lever being supported on the air passage for pivotal motion about a thumbwheel axis;

the lever including a cylindrical axial extension having an outer cylindrical surface concentrically disposed around the thumbwheel axis; and the bushing is a ring-type bushing slidably supported around the outer cylindrical surface of the cylindrical axial extension and fixed against rotation relative to the air passage, the bushing being configured to permit pivotal movement of the lever within the bushing while dampening lever motion by maintaining radially inward pressure on the outer cylindrical surface of the lever.

16. An air vent damper assembly as defined in claim 15 in which the bushing is a spring bushing configured to maintain a generally constant amount of constricting radially inward force on the outer cylindrical surface of the cylindrical axial extension.

17. An air vent damper assembly as defined in claim 16 in which the bushing includes a ring portion, an inside diameter of the ring portion being smaller than an outside diameter of the outer cylindrical surface of the cylindrical axial extension by an amount sufficient to bring to bear a predetermined radially inwardly directed force on the outer cylindrical surface once the ring portion of the bushing is elastically expanded and installed around the cylindrical axial extension.

18. An air vent damper assembly as defined in claim 17 in which the bushing includes a lobe formed radially outwardly at one point along the circumference of the ring portion of the bushing, the lobe being configured to allow the ring portion of the bushing to expand radially without plastically deforming and to enable the ring portion to maintain a generally constant radially inwardly directed force on the outer cylindrical surface of the cylindrical axial extension.

* * * * *

UNITED STATES PATENT AND TRADEMARK OFFICE
CERTIFICATE OF CORRECTION

PATENT NO. : 6,582,293 B1 Page 1 of 1
DATED : June 24, 2003
INVENTOR(S) : Andrew Siniarski It is certified that error appears in the above-identified patent and that said Letters Patent is hereby corrected as shown below:

Column 5,
Line 23, after "turn the" delete "comer" and insert therein -- corner --

Column 6,
Line 23, after "thumbwheel to" insert a comma

Column 7,
Line 38, after "closed and" delete "filly" and insert therein -- fully --

Column 9,
Line 49, after "from one of" delete "an"
Line 51, after "from one of" insert therein -- the --

Signed and Sealed this

Twenty-eighth Day of October, 2003

JAMES E. ROGAN
*Director of the United States Patent and Trademark Office*